US012586311B2

(12) United States Patent
Park et al.

(10) Patent No.: US 12,586,311 B2
(45) Date of Patent: Mar. 24, 2026

(54) APPARATUS AND METHOD FOR RECONSTRUCTING 3D HUMAN OBJECT BASED ON MONOCULAR IMAGE WITH DEPTH IMAGE-BASED IMPLICIT FUNCTION LEARNING

(71) Applicant: Korea Electronics Technology Institute, Seongnam-si (KR)

(72) Inventors: Min Gyu Park, Seoul (KR); Ju Hong Yoon, Hwaseong-si (KR); Ju Mi Kang, Seongnam-si (KR); Je Woo Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 165 days.

(21) Appl. No.: 18/539,462

(22) Filed: Dec. 14, 2023

(65) Prior Publication Data

US 2024/0212267 A1 Jun. 27, 2024

(30) Foreign Application Priority Data

Dec. 22, 2022 (KR) ........................ 10-2022-0181319

(51) Int. Cl.
*G06T 17/00* (2006.01)
*G06V 10/44* (2022.01)

(52) U.S. Cl.
CPC .............. *G06T 17/00* (2013.01); *G06V 10/44* (2022.01)

(58) Field of Classification Search
CPC ........... G06T 17/00; G06T 13/40; G06T 7/50; G06V 10/44
See application file for complete search history.

(56) References Cited

U.S. PATENT DOCUMENTS

| | | | |
|---|---|---|---|
| 2022/0051471 A1* | 2/2022 | Logothetis | G06N 3/08 |
| 2022/0130145 A1* | 4/2022 | Connary | G05D 1/101 |
| 2023/0147722 A1* | 5/2023 | Ramirez de Chanlatte | |
| | | | G06N 3/0442 |
| | | | 345/419 |

OTHER PUBLICATIONS

Saito et al., "PIFuHD: Multi-Level Pixel-Aligned Implicit Function for High-Resolution 3D Human Digitization", In CVPR, p. 84-93, 2020. https://shunsukesaito.github.io/PIFuHD/ (Year: 2020).*
Park et al., "Monocular Human digitization via Implicit Re-projection Networks", arXiv preprint arXiv:2205.06468, 2022. 9 pages. https://doi.org/10.48550/arXiv.2205.06468. (Year: 2022).*

* cited by examiner

*Primary Examiner* — Sing-Wai Wu
(74) *Attorney, Agent, or Firm* — NSIP Law

(57) ABSTRACT

There are provided an apparatus and a method for reconstructing a 3D human object based on a monocular image through depth image-based implicit function learning. A 3D human object reconstruction method according to an embodiment includes: predicting a double-sided ortho-graphic depth map from a front perspective color image of a human object; predicting a signed distance (SD) regarding points on a 3D space from the predicted double-sided orthographic depth map; and reconstructing a 3D human object by using the predicted SD. Accordingly, a human object and details can be naturally reconstructed with respect to not only an area visible through a front perspective color image of the human object but also an invisible area.

17 Claims, 6 Drawing Sheets

| 100 | 200 | 300 | 400 |
|---|---|---|---|
| IMAGE ACQUISITION UNIT | DEPTH MAP PREDICTION UNIT | 3D OBJECT RECONSTRUCTION UNIT | 3D OBJECT APPLICATION UNIT |

1

APPARATUS AND METHOD FOR RECONSTRUCTING 3D HUMAN OBJECT BASED ON MONOCULAR IMAGE WITH DEPTH IMAGE-BASED IMPLICIT FUNCTION LEARNING

CROSS-REFERENCE TO RELATED APPLICATION(S) AND CLAIM OF PRIORITY

This application is based on and claims priority under 35 U.S.C. § 119 to Korean Patent Application No. 10-2022-0181319, filed on Dec. 22, 2022, in the Korean Intellectual Property Office, the disclosure of which is herein incorporated by reference in its entirety.

BACKGROUND

Field

The disclosure relates to a deep learning-based three-dimensional (3D) reconstruction technology, and more particularly, to a method and an apparatus for reconstructing a 3D human object (human body shape) by converting a depth map predicted from a monocular image into 3D occupancy volume space data.

Description of Related Art 3D object reconstruction based on 2D depth map prediction has limitations on information in expressing objects at multiple view points, and achieves high reconstructing performance only with respect to visible areas. To this end, there is a problem that a whole object shape is not well expressed.

Since it is difficult to acquire 3D space data as described above, 3D reconstruction learning may be performed by using 3D data of low quality or virtual data such as skinned multi-person linear model (SMPL) provided in related-art technology However, when shape learning is performed based on a template model such as a SMPL, a shape may be reconstructed depending on the template model, and thus, a result of reconstruction may be unnatural. In addition, SMPL virtual data does not express details such as hair or clothes and thus there is a problem that shapes of human bodies or body types are only reconstructed.

SUMMARY

The disclosure has been developed in order to solve the above-described problems, and an object of the disclosure is to provide, as a solution for naturally reconstructing a human object and details with respect to not only an area visible through a monocular image but also an invisible area, an apparatus and a method for estimating an orthographic normal of front/back sides, a color, a depth map by using a monocular image, and for reconstructing a 3D human object from the predicted depth map by using a deep learning-based implicit function.

According to an embodiment of the disclosure to achieve the above-described objects, a 3D human object reconstruction method may include: a first prediction step of predicting an orthographic image from a front perspective color image of a human object; a second prediction step of predicting a depth map from the predicted orthographic image; and a third prediction step of predicting a signed distance (SD) regarding points on a 3D space from the predicted depth map.

The first prediction step may further include: a step of predicting a double-sided orthographic normal map from the front perspective color image; and a step of predicting a double-sided orthographic color image from the front perspective color image and the predicted double-sided orthographic normal map.

The second prediction step may include predicting a double-sided orthographic depth map from the predicted double-sided orthographic normal map and the double-sided orthographic color image.

The second prediction step may include: a first extraction step of extracting features from the predicted double-sided orthographic normal map; a second extraction step of extracting features from the predicted double-sided orthographic color image; and a step of generating the double-sided orthographic depth map from the features extracted by the first extraction step and the features extracted by the second extraction step.

According to the disclosure, the 3D human object reconstruction method may further include a step of reconstructing a 3D human object by using the predicted SD.

The step of reconstructing may include reconstructing the 3D human object from the predicted SD and the double-sided orthographic color image by using a 3D reconstruction algorithm.

The third prediction step may include: a step of extracting a pixel-aligned feature from the predicted depth map; a step of indicating points on the 3D space one by one in sequence; a step of extracting a ray-invariant feature from the pixel-aligned feature; a step of generating encoded position information by encoding position information of the indicated points; and a step of predicting a SD of a point from the extracted ray-invariant feature and the encoded position information.

The ray-invariant feature may be used for predicting a SD of points existing on a same ray in common.

The pixel-aligned feature and the ray-invariant feature may be extracted on a pixel basis, and the encoded position information may be generated on a point basis.

According to another aspect of the disclosure, there is provided a 3D human object reconstruction apparatus including: a first prediction unit configured to predict an orthographic image from a front perspective color image of a human object, and to predict a depth map from the predicted orthographic image; and a second prediction unit configured to predict a signed distance (SD) regarding points on a 3D space from the predicted depth map.

According to still another aspect of the disclosure, there is provided a 3D human object reconstruction method including: a step of predicting a double-sided orthographic depth map from a front perspective color image of a human object; a step of predicting a signed distance (SD) regarding points on a 3D space from the predicted double-sided orthographic depth map; and a step of reconstructing a 3D human object by using the predicted SD.

As described above, according to embodiments, a 3D human object is reconstructed by predicting an orthographic normal of front/back sides, a color, a depth map by using a monocular image, and reconstructing from the predicted depth map by using a deep learning-based implicit function, so that a human object and details can be naturally reconstructed with respect to not only an area visible through a monocular image but also an invisible area.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure provide a 3D human object reconstruction method based on a single front image. The disclosure relates to a technology for reconstructing a 3D human object by predicting a normal image orthographically projected with respect to front/back sides, a color image, a depth map from a front perspective color image, and converting the predicted depth map into an occupancy volume by using a signed distance function (SDF) such as a deep learning-based implicit function.

In embodiments of the disclosure, various training datasets may be used to be robust to an input image containing various poses and actions. A custom dataset may include data regarding various races, ages, body types, and may include about 20,000 pieces of 3D data.

A RenderPeople dataset includes a shape dataset regarding relatively static poses and normal actions, and has been used in various researches for 3D model learning. A Thuman dataset is a dataset that includes data regarding unusual actions or poses, and may have an effect of enhancing reconstruction performance when it is used for training with other datasets.

Figure 1:
FIG. 1 is a view illustrating a training dataset which is processed by using a training dataset.

The above-described three kinds of datasets may be mixed for use in training, and to process training datasets, various illuminations and rotation in a horizontal direction may be applied by using a rendering tool. FIG. 1 illustrates data which is processed by using a training dataset.

As shown in FIG. 1, training images may be generated by using various illuminations. A dataset may be comprised of an RGB image, a mask, a UV Normal, Mask, Pos, Render RGB image, a parameter, and sampling data of a 3D object.

Figure 2:
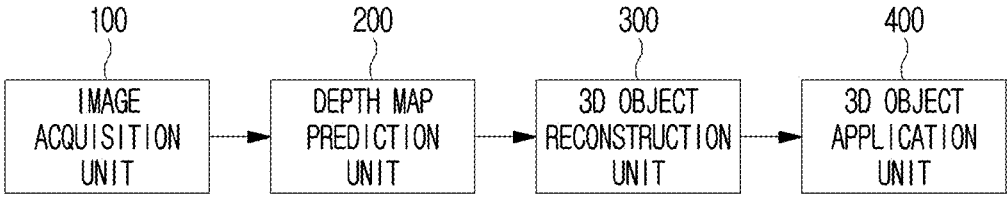
FIG. 2 is a view illustrating a configuration of a 3D human object reconstruction system according to an embodiment of the disclosure.

FIG. 2 is a view illustrating a configuration of a 3D human object reconstruction system based on a front perspective color image according to an embodiment. As shown in FIG. 2, the 3D human object reconstruction system according to an embodiment may include a 2D image acquisition unit 100, a depth map prediction unit 200, a 3D object reconstruction unit 300, and a 3D object application unit 400.

The 2D image acquisition unit 100 is a means for acquiring a monocular human object image, and may be a general camera, a smartphone, or the like. The 2D image acquisition unit 100 should shoot the front of a person and may use a perspective RGB camera. Accordingly, a 2D image acquired by the 2D image acquisition unit 100 is referred to as a front perspective color image.

The depth map prediction unit 200 predicts a double-sided orthographic normal image, a double-sided orthographic color image, a double-sided orthographic depth map in sequence from the front perspective color image acquired through the 2D image acquisition unit 100.

Figure 3:
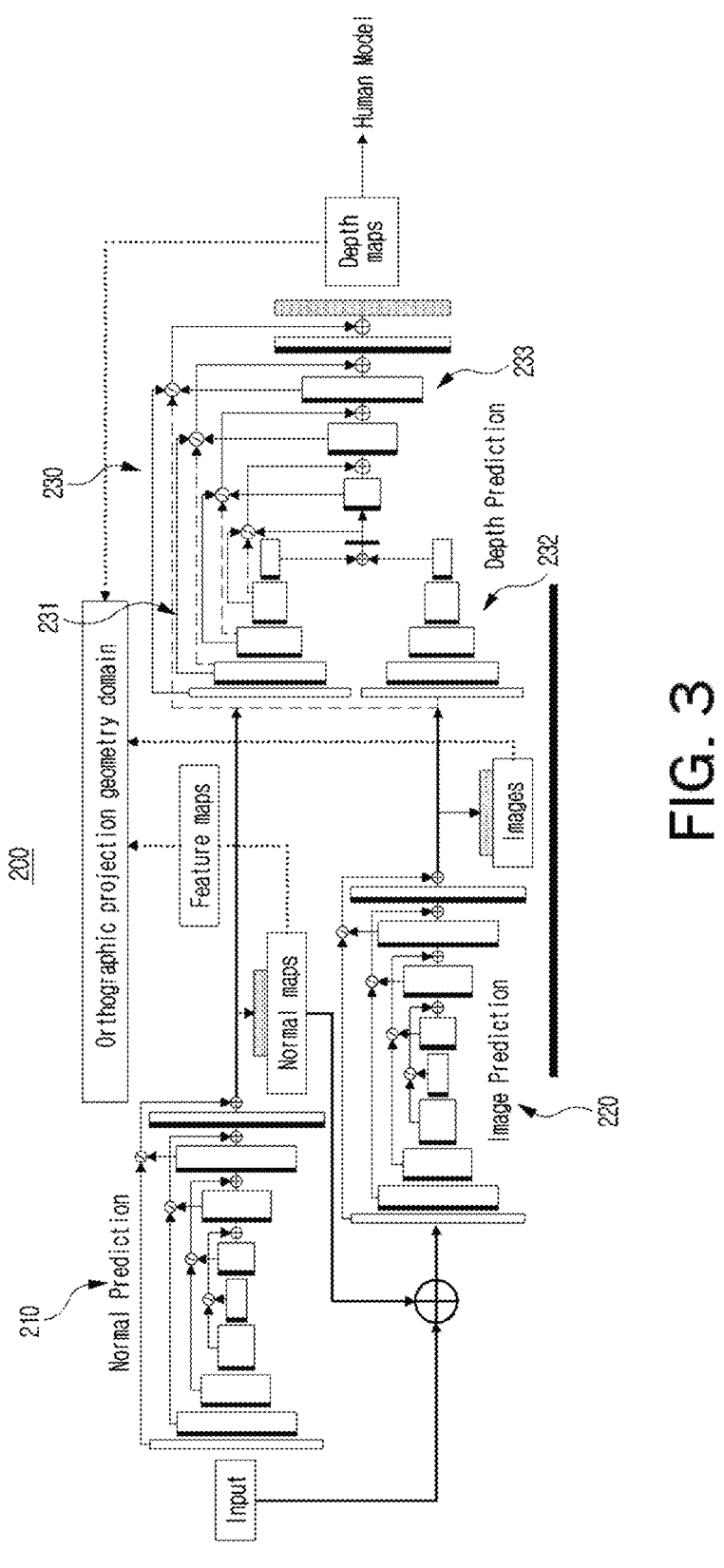
FIG. 3 is a view illustrating a detailed configuration of a depth map prediction unit of FIG. 2.

FIG. 3 is a view illustrating a detailed configuration of the depth map prediction unit 200. As shown in FIG. 3, the depth map prediction unit 200 may include an orthographic normal prediction model 210, an orthographic image prediction model 220, and an orthographic depth prediction model 230.

The orthographic normal prediction model 210 is a deep learning model of an ATUNet structure that is trained to predict a double-sided orthographic normal map by analyzing a single-sided perspective color image. A double-sided orthographic normal map may be predicted from an inputted single-sided perspective color image by the orthographic normal prediction model 210.

The orthographic image prediction model 220 is a deep learning model of an ATUNet structure that is trained to predict a double-side orthographic color image by analyzing a single-sided perspective color image and a double-sided orthographic normal map which is predicted by the orthographic normal prediction model 210. A double-sided orthographic color image may be predicted from inputted single-sided perspective color image and double-sided orthographic normal map by the orthographic image prediction model 220.

The orthographic depth prediction model 230 is a deep learning model of an ATUNet structure that is trained to predict a double-sided orthographic depth map by analyzing a double-sided orthographic normal map predicted by the orthographic normal prediction model 210, and a double-sided orthographic color image predicted by the orthographic image prediction model 220. A double-sided orthographic depth map may be predicted from a double-sided orthographic normal map and a double-sided orthographic color image by the orthographic depth prediction model 230.

The orthographic depth prediction model 230 may include an encoder-1 231, an encoder-2 232, and a decoder 233.

The encoder-1 231 may extract features from the double-sided orthographic normal map, and the encoder-2 232 may extract features from the double-sided orthographic color image. The decoder 233 may generate a double-sided orthographic depth map from the features extracted by the encoders 231, 232.

The order of prediction originated from the results of experiments. It was found in a process of experimenting a model reconstruction method that, when direct prediction was performed without predicting prior information, it was difficult to reconstruct details, and, when normal map prediction preceded, efficiency of reconstruction increased. Accordingly, the reconstruction model presented in FIG. 3 was configured, and a problem that may arise in a volume conversion and mesh reconstruction process could be solved by directly predicting an orthographic image.

Since a double-sided orthographic depth map can be converted into an occupancy volume, the depth map prediction unit 200 may be trained according to a sample point of a surface which is sampled from a ground truth 3D object volume.

Referring back to FIG. 2, the 3D object reconstruction unit 300 reconstructs a 3D human object from the double-sided orthographic depth map predicted by the depth map prediction unit 200, by using a deep learning-based signed distance function (SDF).

The SDF is a function that predicts a signed distance (SD) (encoded distance information) of an object surface in a 3D space as 0. Accordingly, since an object is reconstructed by summing all points on the 3D space where the SD is 0, the SDF may be used for reconstructing a 3D human object.

Unlike a related-art deep learning-based implicit function which predicts SDs regarding points by using a pixel-aligned feature as it is, the method in an embodiment of the disclosure encodes a pixel-aligned feature once more and extracts a ray-invariant feature, and reuses the ray-invariant feature in predicting SDs of all points on the same ray, so that an amount of computation can be reduced and a speed can be enhanced.

Figure 4:
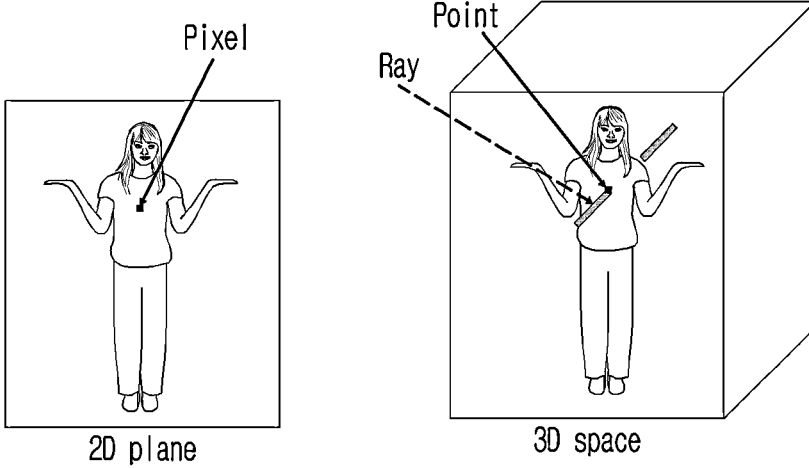
FIG. 4 is a view to explain concepts of a pixel, a point, and a ray.

Concepts of a pixel, a point, a ray which are used in embodiments of the disclosure are illustrated in FIG. 4, and are defined as follows:

Pixel: One point (x, y) on a 2D plane

Point: One point (x, y, z) on a 3D space

Ray: A set of points (x, y, z) having the same (x, y); for example, point (x, y, 1), point (x, y, 2), point (x, y, 3), . . . , point (x, y, Z) are points existing on the same ray. A ray direction in the 3D space is the same as a depth direction.

In an embodiment of the disclosure, encoded position information regarding a point may be generated to add a position-specific feature to the ray-invariant feature, and may be used for predicting SDs of points along with the ray-invariant feature.

Figure 5:
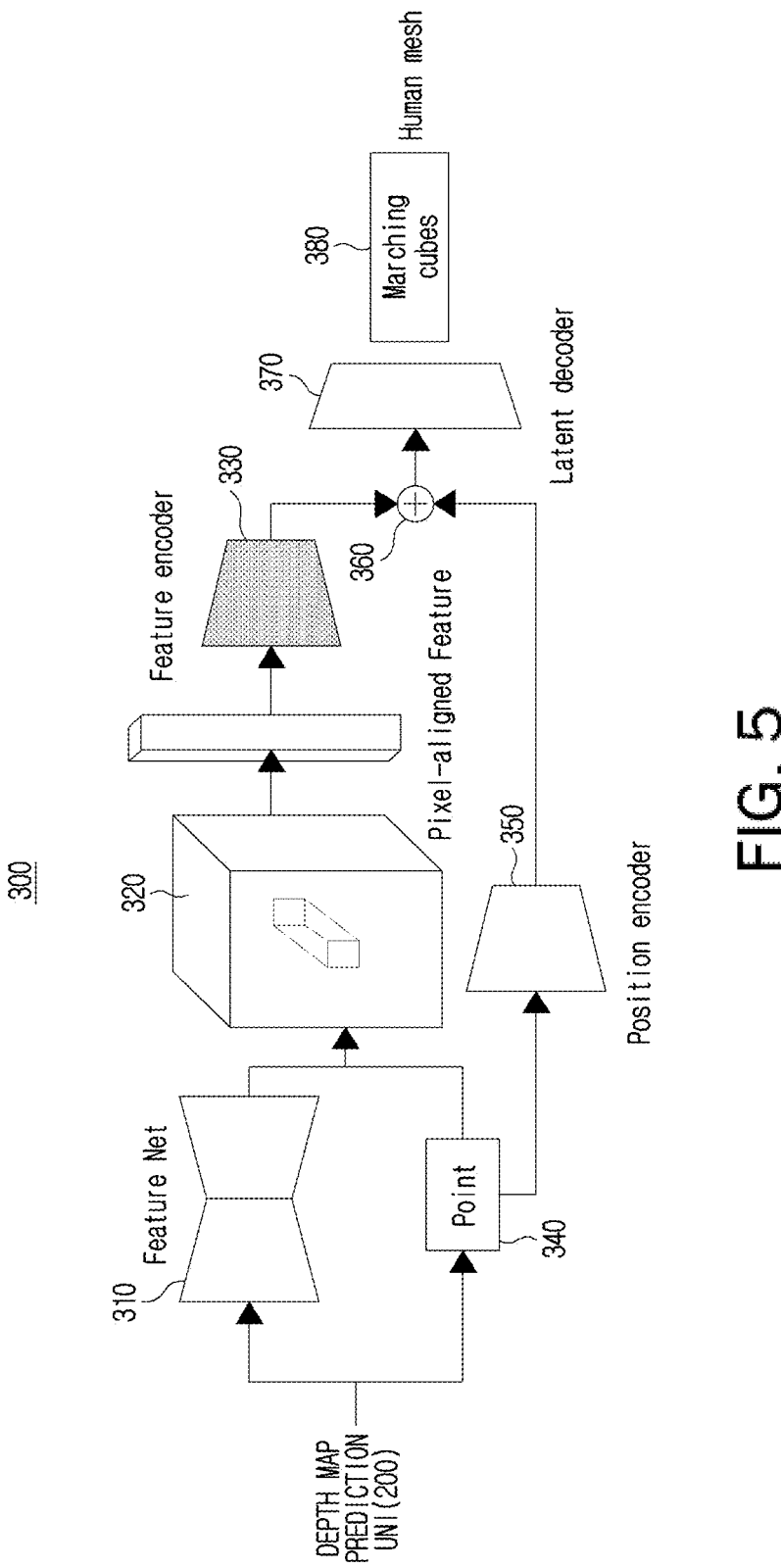
FIG. 5 is a view illustrating a detailed configuration of a 3D object reconstruction unit of FIG. 2.

FIG. 5 is a view illustrating a detailed configuration of the 3D object reconstruction unit 300. As shown in FIG. 5, the 3D object reconstruction unit 300 may include a feature extraction network 310, a feature selector 320, a feature encoder 330, a pointer 340, a position encoder 350, a merging unit 360, a decoder 370, and a reconstruction unit 380.

The feature extraction network 320 is a deep learning network that is trained to extract pixel-aligned features from a double-sided orthographic depth map. The pixel-aligned features are features that are aligned with pixels, and are a vector that lists features of points on a 3D space which are at the same coordinates (x, y) as pixels, specifically, points existing on a ray passing pixels.

The pointer 340 indicates points on the 3D space one by one in sequence. Points are indicated by the pointer 30 based on a ray order. Points on the ray of the first pixel are indicated in sequence, points on the ray of the second pixel are indicated in sequence, and in the same way, points on the ray of the last pixel are indicated in sequence.

The feature selector 320 selects and extracts a pixel-aligned feature from the pixel-aligned features extracted by the feature extraction unit 130 on a pixel basis. That is, only when a point indicated by the pointer 340 is (x, y, 0), pixel-aligned features regarding the ray where the corresponding point is positioned are extracted.

Accordingly, a pixel-aligned feature extracted by the feature selector 320 may be a pixel-aligned feature of a pixel (x, y) corresponding to the point (x, y, z) indicated by the pointer 340.

The feature encoder 330 is a deep learning network that is trained to extract a ray-invariant feature from a pixel-aligned feature extracted by the feature selector 320. The ray-invariant feature is used for points existing on the same ray in common. That is, the ray-invariant feature has a characteristics of being reused for points existing on the same ray.

The position encoder 350 is a deep learning network that is trained to generate encoded position information by encoding position information of a point indicted by the pointer 340.

The merging unit 360 concatenates the ray-invariant feature outputted from the feature encoder 330 and the encoded position information outputted from the position encoder 350. The decoder 370 is a deep learning network that is trained to predict a SD of a point from information concatenated by the merging unit 360 on a point basis.

Computation by the position encoder 350 is performed on a point basis, and accordingly, encoded position information is generated at every point. On the other hand, computation by the feature encoder 330 is performed on a pixel basis (that is, a ray basis) rather than on a point basis.

Compared to a related-art method in which feature encoding computation for implicit function learning is performed on a point basis, the method in an embodiment of the disclosure performs corresponding computation on a pixel basis, so that an amount of computation of the feature encoder 330, which requires a large amount of computation, can be noticeably reduced and optimally the speed of the 3D human object reconstruction apparatus can be remarkably enhanced.

The reconstruction unit 380 reconstructs a 3D human object from the SD of the point predicted from the decoder 370 by using a 3D model reconstruction technique such as a marching cube algorithm, and reconstructs a 3D color human object by applying colors to the reconstructed 3D human object.

To apply colors, the reconstruction unit 380 may use the front perspective color image acquired by the 2D image acquisition unit 100 or may use the double-sided orthographic color image predicted by the orthographic image prediction model 220 of the depth map prediction unit 200.

A method of reconstructing a 3D shape only through a 2D image has a demerit that it is difficult to reconstruct a shape at multiple view points since it makes a robust model only for details and shapes of a front image (visible area).

When 3D volume prediction is performed only by using a result of predicting by the depth map prediction unit 200, a multi-view depth map is predicted only with information regarding the front. Therefore, it is difficult to predict shapes of the side or back of a real object or details such as wrinkles of clothes or hair. To this end, reconstructed 3D objects have similar back shapes and various poses are difficult to predict.

Figures 6A, 6B:
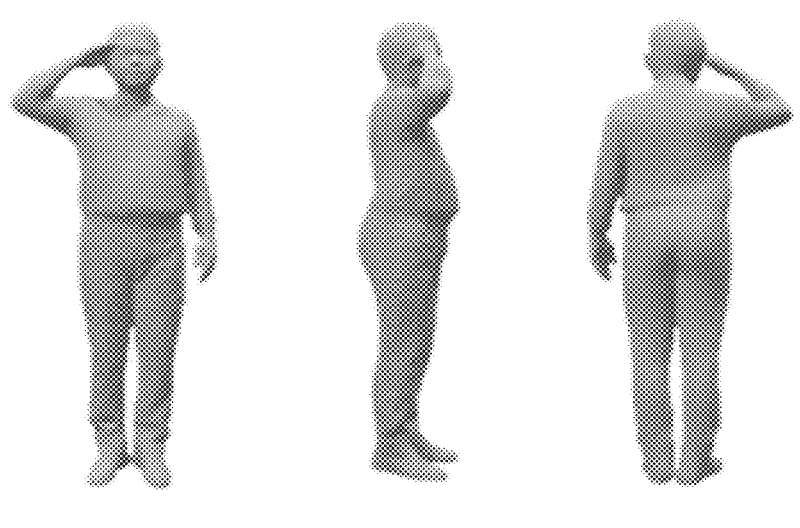
FIG. 6A is a view illustrating a result of 3D object reconstruction using a different method.
FIG. 6B is a view illustrating a result of 3D object reconstruction using a different method.
Figure 6C:
FIG. 6C is a view illustrating a result of 3D object reconstruction using a different method.
Figure 6D:
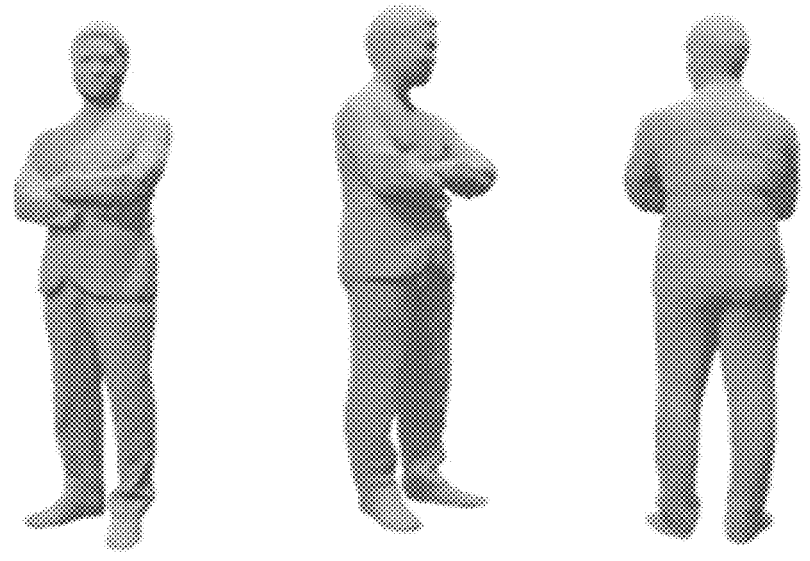
FIG. 6D is a view illustrating a result of 3D object reconstruction using a different method.

FIG. 6A is a view illustrating a result of reconstructing a 3D human object based on a depth map generated by the depth map prediction unit 200, FIG. 6B is a view illustrating a result of reconstructing a 3D human object based on a depth map generated by the depth map prediction unit 200, FIG. 6C is a view illustrating a result of reconstructing a 3D human object when the depth map prediction unit 200 and the 3D object reconstruction unit 300 are used concurrently, and FIG. 6D is a view illustrating a result of reconstructing a 3D human object when the depth map prediction unit 200 and the 3D object reconstruction unit 300 are used concurrently.

When only the depth map prediction unit 200 is used, front shapes and details are naturally reconstructed, but multi-view shapes are not predicted and there is no information regarding the back, and accordingly, there is a lack of detail in the reconstructed shapes of the side and the back.

On the other hand, when the depth map prediction unit 200 and the 3D object reconstruction unit 300 are used concurrently, position information of 3D points is used and a 3D volume is predicted. Accordingly, it can be seen that a 3D pose or shape is naturally reconstructed.

Referring back to FIG. 2, the 3D object application unit 400 may convert/process the 3D human object reconstructed by the 3D object reconstruction unit 300 to be applied to the fields of sports, entertainments, games, medical service, etc. Specifically, the reconstructed 3D human object may be used for generating avatars in virtual/augmented reality, 3D printing service, etc.

Up to now, a method of reconstructing a 3D human object by predicting a double-sided orthographic depth map from a front perspective color image and converting the double-sided orthographic depth map into an occupancy volume based on an SDF which is trained through deep learning has been described with reference to preferred embodiments.

In addition, in embodiments of the disclosure, to solve problems which may arise in occupancy volume-based perspective reconstruction, orthographic depth map prediction is applied. Since an orthographic image expresses pixels with the same distance without receiving influence on positions, a reconstructed model can face the front without being bent.

Accordingly, natural 3D human object reconstruction can be achieved not only for an area visible through a single front image but also for an invisible area, and reconstructed 3D human objects may be used in various application services.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A three-dimensional (3D) human object reconstruction method comprising:
   performing a first prediction operation of predicting an orthographic image from a front perspective color image of a human object;
   performing a second prediction operation of predicting a depth map from the predicted orthographic image; and
   performing a third prediction operation of predicting a signed distance (SD) regarding points on a 3D space from the predicted depth map,
   wherein the third prediction operation comprises:
   extracting a pixel-aligned feature from the predicted depth map;
   indicating points on the 3D space one by one in sequence;
   extracting a ray-invariant feature from the pixel-aligned feature;
   generating encoded position information by encoding position information of the indicated points; and
   predicting a SD of a point from the extracted ray-invariant feature and the encoded position information.

2. The 3D human object reconstruction method of claim 1, wherein the performing the first prediction operation further comprises:
   predicting a double-sided orthographic normal map from the front perspective color image; and
   predicting a double-sided orthographic color image from the front perspective color image and the predicted double-sided orthographic normal map.

3. The 3D human object reconstruction method of claim 2, wherein the performing the second prediction operation comprises predicting a double-sided orthographic depth map from the predicted double-sided orthographic normal map and the double-sided orthographic color image.

4. The 3D human object reconstruction method of claim 3, wherein the performing the second prediction operation comprises:
   performing a first extraction operation of extracting features from the predicted double-sided orthographic normal map;
   performing a second extraction operation of extracting features from the predicted double-sided orthographic color image; and
   generating the double-sided orthographic depth map from the features extracted by the first extraction operation and the features extracted by the second extraction operation.

5. The 3D human object reconstruction method of claim 3, further comprising reconstructing a 3D human object by using the predicted SD.

6. The 3D human object reconstruction method of claim 5, wherein the reconstructing comprises reconstructing the 3D human object from the predicted SD and the double-sided orthographic color image by using a 3D reconstruction algorithm.

7. The 3D human object reconstruction method of claim 1, wherein the ray-invariant feature is used for predicting a SD of points existing on a same ray in common.

8. The 3D human object reconstruction method of claim 1, wherein the pixel-aligned feature and the ray-invariant feature are extracted on a pixel basis, and wherein the encoded position information is generated on a point basis.

9. A three-dimensional (3D) human object reconstruction apparatus comprising:

one or more processors comprising:

a first prediction unit configured to predict an orthographic image from a front perspective color image of a human object, and to predict a depth map from the predicted orthographic image; and a second prediction unit configured to predict a signed distance (SD) regarding points on a 3D space from the predicted depth map, wherein the one or more processors are further configured to:

extract a pixel-aligned feature from the predicted depth map;

indicate points on the 3D space one by one in sequence;

extract a ray-invariant feature from the pixel-aligned feature;

generate encoded position information by encoding position information of the indicated points; and predict a SD of a point from the extracted ray-invariant feature and the encoded position information.

10. The apparatus of claim 9, wherein, for the predicting an orthographic image, the one or more processors are further configured to:

predict a double-sided orthographic normal map from the front perspective color image; and predict a double-sided orthographic color image from the front perspective color image and the predicted double-sided orthographic normal map.

11. The apparatus of claim 10, wherein, for the predicting the signed distance (SD), the one or more processors are further configured to predict a double-sided orthographic depth map from the predicted double-sided orthographic normal map and the double-sided orthographic color image.

12. The apparatus of claim 11, wherein, for the predicting the signed distance (SD), the one or more processors are further configured to:

perform a first extraction operation of extracting features from the predicted double-sided orthographic normal map;

perform a second extraction operation of extracting features from the predicted double-sided orthographic color image; and generate the double-sided orthographic depth map from the features extracted by the first extraction operation and the features extracted by the second extraction operation.

13. The apparatus of claim 11, wherein the one or more processors are further configured to reconstruct a 3D human object by using the predicted SD.

14. The apparatus of claim 13, wherein, for the reconstructing, the one or more processors are further configured to reconstruct the 3D human object from the predicted SD and the double-sided orthographic color image by using a 3D reconstruction algorithm.

15. The apparatus of claim 9, wherein the ray-invariant feature is used for predicting a SD of points existing on a same ray in common.

16. The apparatus of claim 9, wherein the pixel-aligned feature and the ray-invariant feature are extracted on a pixel basis, and wherein the encoded position information is generated on a point basis.

17. A three-dimensional (3D) human object reconstruction method, performed by one or more processors, the method comprising:

predicting a double-sided orthographic depth map from a front perspective color image of a human object;

predicting a signed distance (SD) regarding points on a 3D space from the predicted double-sided orthographic depth map; and reconstructing a 3D human object by using the predicted SD, wherein the predicting the signed distance (SD) comprises:

extracting a pixel-aligned feature from the predicted double-sided orthographic depth map;

indicating points on the 3D space one by one in sequence;

extracting a ray-invariant feature from the pixel-aligned feature;

generating encoded position information by encoding position information of the indicated points; and predicting a SD of a point from the extracted ray-invariant feature and the encoded position information.

\* \* \* \* \*